United States Patent
Kim et al.

(10) Patent No.: US 9,186,985 B2
(45) Date of Patent: Nov. 17, 2015

(54) CABLE SLACK PREVENTION DEVICE AND FUEL DOOR APPARATUS PROVIDED WITH THE SAME

(71) Applicant: Hyundai Motor Company, Seoul (KR)

(72) Inventors: Jang ho Kim, Hwaseong-Si (KR); Won Seok Kim, Suwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 12 days.

(21) Appl. No.: 14/065,017

(22) Filed: Oct. 28, 2013

(65) Prior Publication Data
US 2015/0028619 A1    Jan. 29, 2015

(30) Foreign Application Priority Data
Jul. 24, 2013    (KR) .................. 10-2013-0087159

(51) Int. Cl.
*B60K 15/05* (2006.01)
*F16C 1/22* (2006.01)
*F16C 1/26* (2006.01)

(52) U.S. Cl.
CPC ............... *B60K 15/05* (2013.01); *F16C 1/223* (2013.01); *F16C 1/267* (2013.01); *B60K 2015/0515* (2013.01); *F16C 2326/01* (2013.01)

(58) Field of Classification Search
CPC ........... B60K 15/05; B60K 2015/0507; B60K 2015/0515; B60K 2015/0523; B60K 2015/053; B60K 2015/0538; B60K 2015/0546; B60K 2015/0561; B60K 2015/0569; B60K 2015/0576; B60K 2015/0584

USPC .......... 296/97.22; 292/7, 38, 58, 96, 97, 171, 292/141, 196, DIG. 22; 180/69.4; 74/841, 74/500.5, 502.4–502.6
See application file for complete search history.

(56) References Cited

U.S. PATENT DOCUMENTS

| | | | | |
|---|---|---|---|---|
| 2,101,348 A | * | 12/1937 | Schellinger | 292/141 |
| 2,145,212 A | * | 1/1939 | Edwards et al. | 220/326 |
| 4,633,724 A | * | 1/1987 | Mochida | 74/471 R |
| 4,917,418 A | * | 4/1990 | Gokee | 292/125 |
| 5,080,421 A | * | 1/1992 | Otowa et al. | 296/97.22 |
| 5,160,180 A | * | 11/1992 | Mlynarczyk | 292/252 |
| 5,293,785 A | * | 3/1994 | Lichtenberg | 74/500.5 |
| 5,544,780 A | * | 8/1996 | Jye | 220/211 |
| 5,653,148 A | * | 8/1997 | Reasoner | 74/502.4 |
| 5,906,406 A | * | 5/1999 | Pajakowski | 296/97.22 |

(Continued)

FOREIGN PATENT DOCUMENTS

| | | |
|---|---|---|
| JP | 7-8185 U | 2/1995 |
| KR | 1997-0006093 A | 2/1997 |

(Continued)

*Primary Examiner* — Gregory Blankenship
(74) *Attorney, Agent, or Firm* — Morgan, Lewis & Bockius LLP

(57) ABSTRACT

A cable slack prevention device may include: a cable to both ends of which a first operation part and a second operation part are connected, respectively, and which is pulled by an operation of the first operation part to link with the second operation part; a fixing body which is fixed to the cable with surrounding it and is formed as a cylinder shape, and on an outer peripheral surface of which outer screws are formed; and a guide bracket which is fixed to a vehicle body and surrounds the fixing body, and on an inner peripheral surface of which inner screws are formed and the inner screws are meshed with the outer screws of the fixing body, allowing the cable to be rotated and twisted when the cable is pulled.

8 Claims, 4 Drawing Sheets

(56) References Cited

U.S. PATENT DOCUMENTS

| | | | |
|---|---|---|---|
| 5,936,500 A * | 8/1999 | Martus et al. | 335/229 |
| 6,234,557 B1 * | 5/2001 | Bae | 296/97.22 |
| 6,378,919 B1 * | 4/2002 | Kitchen | 292/171 |
| 6,808,226 B2 * | 10/2004 | Hirano | 296/155 |
| 7,334,498 B2 * | 2/2008 | Yokomori et al. | 74/502.4 |
| 7,766,410 B2 * | 8/2010 | Tseng et al. | 296/97.22 |
| 8,100,032 B2 * | 1/2012 | Boehm | 74/502.4 |
| 8,850,921 B2 * | 10/2014 | Ma | 74/502.6 |
| 2014/0084599 A1 * | 3/2014 | Beck | 292/58 |

FOREIGN PATENT DOCUMENTS

| | | |
|---|---|---|
| KR | 1997-0046210 A | 7/1997 |
| KR | 1998-029235 A | 7/1998 |
| KR | 1998-036892 U | 9/1998 |
| KR | 10-2004-0088207 A | 10/2004 |
| KR | 10-2011-0037315 A | 4/2011 |
| KR | 10-2012-0054700 A | 5/2012 |

* cited by examiner

FIG. 7A
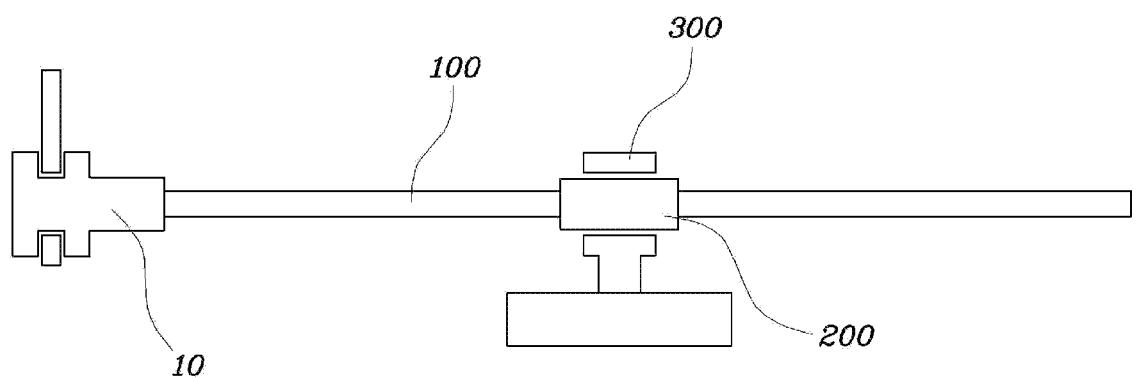
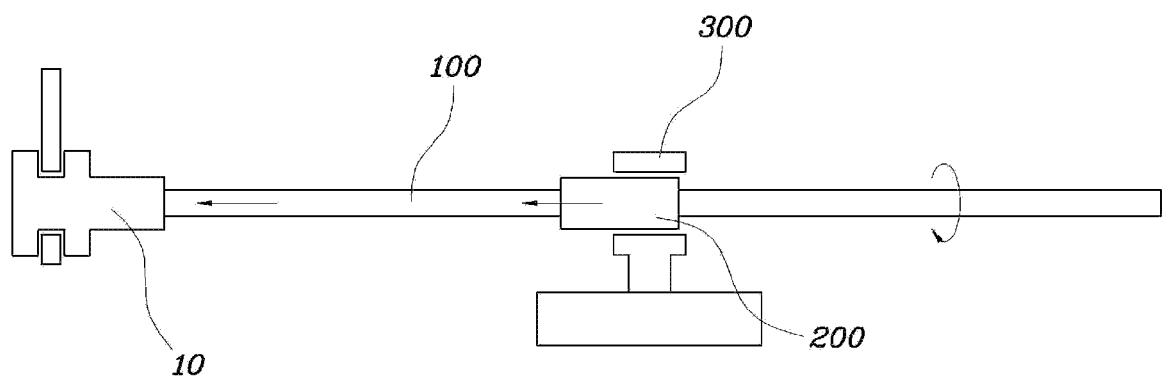
FIG. 7B

CABLE SLACK PREVENTION DEVICE AND FUEL DOOR APPARATUS PROVIDED WITH THE SAME

CROSS-REFERENCE TO RELATED APPLICATION

The present application claims priority of Korean Patent Application Number 10-2013-0087159 filed Jul. 24, 2013, the entire contents of which application is incorporated herein for all purposes by this reference.

BACKGROUND OF INVENTION

1. Field of Invention

The present disclosure relates to a cable slack prevention device to improve the durability and efficiency of the cable that transfers the operating force.

2. Description of Related Art

Generally, a fuel tank, in which fuel is stored, is provided to a vehicle and a fuel inlet through which fuel is injected to the fuel tank from outside is formed at a rear side of the vehicle. The fuel inlet is provided with a fuel door for protecting the fuel inlet and preventing an accident due to a fuel leak.

Here, a fuel door opening/closing unit is provided to the fuel door in order for a driver to control the opening/closing of the fuel door inside the vehicle.

As shown in FIG. 1, a door handle 10 is provided inside a vehicle for opening/closing a fuel door 30 and is connected to a latch 40 for latching the fuel door 30 that covers a fuel inlet 32 through a cable 20 wherein when a driver operates the door handle 10, the latch 40 releases the fuel door 30 to be opened automatically with a pop-up spring 34.

Here, the cable 20 is designed to have a proper length such that the operating force of the door handle 10 is transferred adequately to the latch 40, but the cable can be deteriorated when it is used for a long time and further the cable can be deformed due to an external factor, and thus a length of the cable can be lengthened excessively.

Under this state, even when a driver pulls sufficiently the door handle 10, the operating force may not to be transferred smoothly to the latch 40, so the fuel door 30 may not be able to open. In addition, the clearance between the door handle 10 and the cable 10 is increased or the cable 20 is loosened to decrease transfer efficiency of the operating force, and thus the operation load and stroke as intended when it is designed initially are not transferred properly and so result in mal-operation of the fuel door 30.

The drawbacks as described above may occur to all components for transferring the operating force by using the cable in addition to the fuel door.

Accordingly, a need exists for cable enforcement means in order to increase the transfer efficiency of the operating force through which the deformation of the components connected to the cable and the looseness of the cable itself can be prevented.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to solve the above-described problems associated with prior art.

Various aspects of the present invention provide for a cable slack prevention device in which a cable is guided to be twisted when the cable is pulled due to an external force, to increase rigidity and reduce a length of the cable thereby to transfer smoothly the operating force through the cable.

Various aspects of the present invention provide for a cable slack prevention device, including: a cable to both ends of which a first operation part and a second operation part are connected, respectively, and which is pulled by an operation of the first operation part to link with the second operation part; a fixing body which is fixed to the cable with surrounding it and is formed as a cylinder shape, and on an outer peripheral surface of which outer screws are formed; and a guide bracket which is fixed to a vehicle body and surrounds the fixing body, and on an inner peripheral surface of which inner screws are formed, which are meshed with the outer screws of the fixing body, allowing the cable to be rotated and twisted when the cable is pulled.

The first operation part may be an operation handle that is handled by a user and the second operation part may be a latch.

The cable may be formed with a plurality of wires to be twisted in a direction and the outer screws of the fixing body are formed in the oblique lines directed to the same direction as the twisted direction of the cable.

The cable may be wire rope that is formed with a plurality of wires twisted as a several strands.

The fixing body may be fixed not to be rotated relatively to the cable and may be moved together with the cable when the cable is pulled.

The outer screws of the fixing body may be formed to be longer than a maximal moving displacement of the cable.

The inner screws of the guide bracket may be formed to be longer than a maximal moving displacement of the cable.

A width of the guide bracket in a longitudinal direction may be formed to be narrower than a width of the fixing body in a longitudinal direction.

Various aspects of the present invention provide for a fuel door apparatus provided with a cable slack prevention device, including: a door handle that is operated by a user to open/close selectively a fuel door hinged and fixed to a vehicle body; a latch for releasing the latching operation of a fuel door to open the fuel door; a cable one end of which is connected to the door handle and the other end of which is connected to the latch, and which is pulled with the operation of the door handle to release the latching operation of the latch; a fixing body which is fixed to the cable with surrounding a part of the cable and is formed as a cylinder shape, and on an outer peripheral surface of which outer screws are formed; and a guide bracket which is fixed to a vehicle body and surrounds the fixing body, and on an inner peripheral surface of which inner screws are formed, which are meshed with the outer screws of the fixing body, allowing the cable to be rotated along the screws and twisted when the cable is pulled.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7A is a perspective view showing the cable slack prevention device, which is operating, as shown in FIG. 2.

FIG. 7B is a perspective view showing the cable slack prevention device, which is operating, as shown in FIG. 2.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a cable slack prevention device according to an exemplary embodiment of the present invention will be described, referring to the accompanying drawings.

Figure 1:
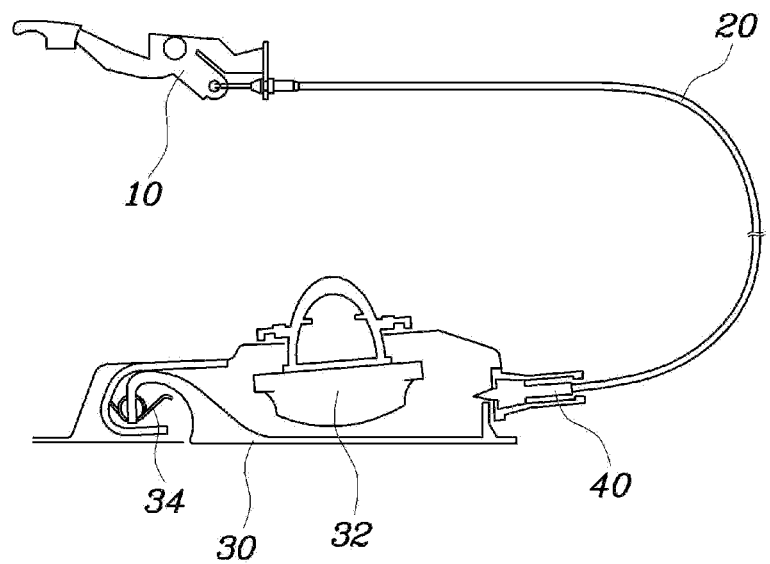
FIG. 1 is a perspective view showing a fuel door apparatus according to a related art.
Figure 2:
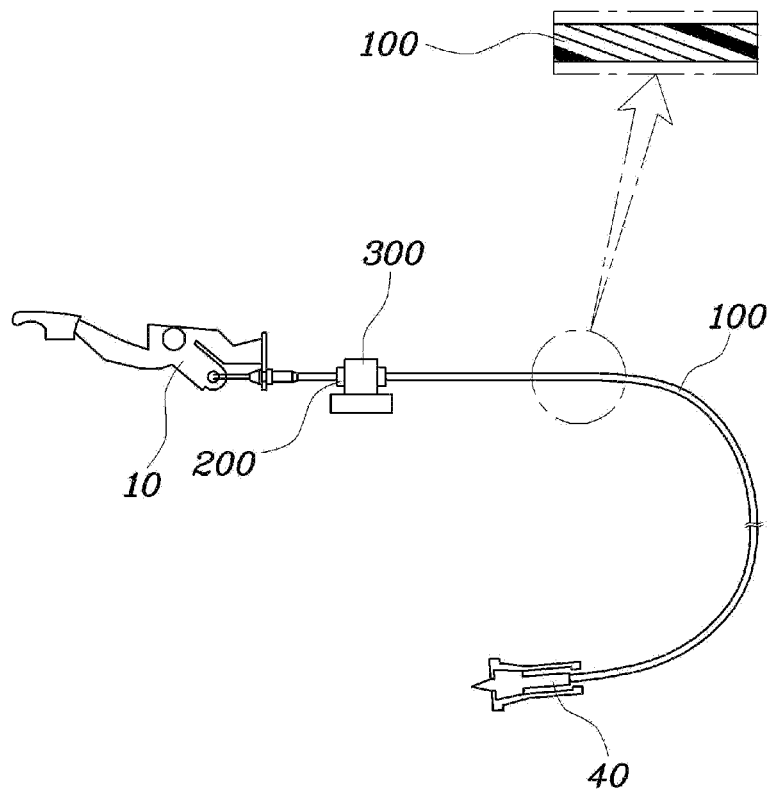
FIG. 2 is a perspective view showing an exemplary cable slack prevention device according to the present invention.
Figure 3:
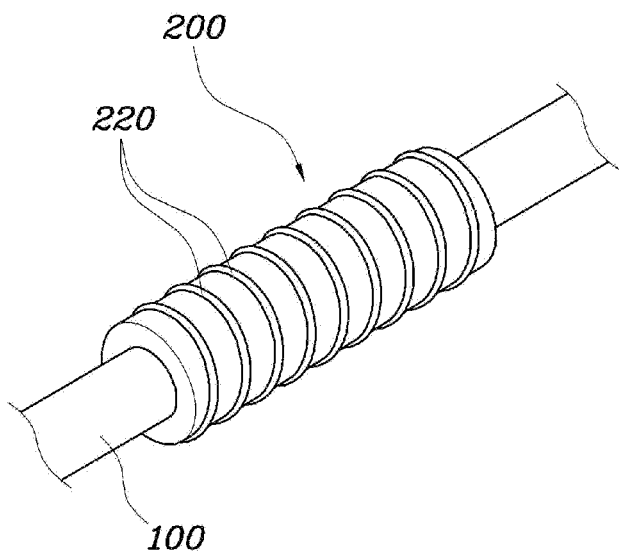
FIG. 3 is a perspective view showing a cable and a fixing body of the cable slack prevention device as shown in FIG. 2.
Figure 4:
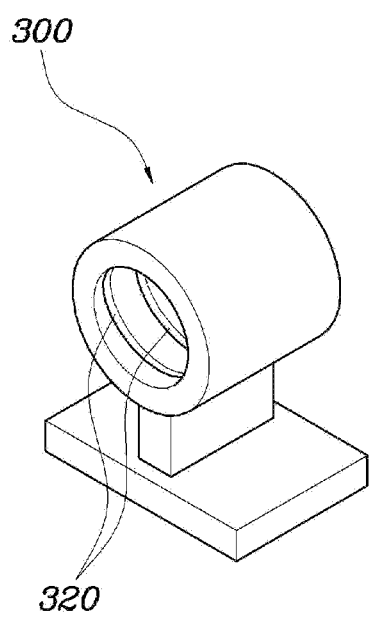
FIG. 4 is a perspective view showing a guide bracket of the cable slack prevention device as shown in FIG. 2.
Figure 5:
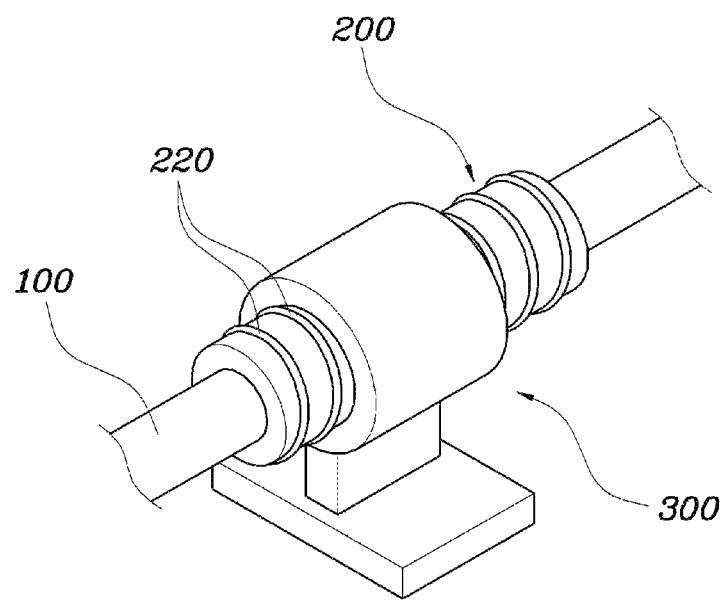
FIG. 5 is a perspective view showing a fixing body and guide bracket of the cable slack prevention device as shown in FIG. 2, which are meshed with each other.

FIG. 2 is a perspective view showing a cable slack prevention device according to various embodiments of the present invention, FIG. 3 is a perspective view showing a cable and a fixing body of the cable slack prevention device as shown in FIG. 2, FIG. 4 is a perspective view showing a guide bracket of the cable slack prevention device as shown in FIG. 2, and FIG. 5 is a perspective view showing the fixing body and guide bracket of the cable slack prevention device as shown in FIG. 2, which are meshed with each other.

Referring to the drawings, a cable slack prevention device includes: a cable 100 to both ends of which a first operation part 10 and a second operation part 40 are connected, respectively, and which is pulled by an operation of the first operation part 10 to link with the second operation part 40; a fixing body 200 which is fixed to the cable 100 with surrounding a part of the cable 100 and is formed as a cylinder shape, and on an outer peripheral surface of which outer screws 220 are formed; and a guide bracket 300 which is fixed to a vehicle body and surrounds the fixing body 200, and on an inner peripheral surface of which inner screws 320 are formed, which are meshed with the outer screws 220 of the fixing body 200, allowing the cable 100 to be rotated and twisted when the cable 100 is pulled.

According to the cable slack prevention mechanism, the operating force produced by a specific work at one side is transferred to the other side by using the cable 100 wherein the cable is guided to be twisted while the cable is moved thereby to increase durability of the cable and efficiency of the operation.

Here, even though the mechanism for transferring the operating force using the cable 100 is applied to various fields, and the cable 100 is configured to transfer the operating force for opening or closing the fuel door in the present invention, the slack prevention mechanism for the cable 100 according to the present invention is not limited to applying to the fuel door.

Meanwhile, the cable 100 according to the present invention transfers the operating force produced when the first operation part 10 operates to the second operation part 40. The cable 100 may be formed in various shapes such as iron wire, etc., but the cable 100 according to the present invention, which is to be rotated and twisted when it is pulled, may formed with wire rope which is kept in a twisting state at an initial stage.

Further, the fixing body 200 formed in a cylinder shape is fixed to the cable 100 to surround a part thereof. In a case of a general cable 100, the outer peripheral surface thereof is coated with PVC and the cable is fixed to a vehicle body with a clip wherein the fixing body 200 is connected directly to the twisted wire within the cable 100 except for other components to be moved and rotated integrally with the cable 100. The outer screws 220 are formed on an outer peripheral surface of the fixing body 200 and the outer screws 220 are formed with threads of a screw in oblique lines.

Here, the cable 100 of the present invention is configured to be rotated and twisted when it is pulled, wherein the cable is provided with the guide bracket 300 which is fixed to a vehicle body and surrounds the fixing body 200 and on an inner peripheral surface of which the inner screws 320 to be meshed with the outer screws 220 of the fixing body 200 are formed. The inner screws 320 of the guide bracket 300 are formed in the oblique lines in the same direction as the oblique lines of the threads of the outer screws 220 of the fixing body 200 to be corresponded thereto.

In a case where the cable 100 is pulled through the configuration as described above, when the first operation part 10 operates, the fixing body 200 is rotated along the threads due to a relative movement between the outer screws 220 of the fixing body 200 and the inner screws 320 of the guide bracket 300, and then the cable 100 is to be twisted due to a rotation of the fixing body 200. The cable 100 is guided to be twisted through the fixing body 200 and the guide bracket 300 to shorten a length of the cable 100 thereby to improve an operational efficiency and further the cable is pulled while it is twisted to increase rigidity, and thereby to improve durability.

In more detailed description, the first operation part 10 may be an operation handle that can be operated by a user, and the second operation part 40 may be formed with a latch. The operation handle constituting the first operation part 10 is provided inside a vehicle to be operated easily by a driver. When a driver operates upwardly the operation handle, the cable 100 to which one end of the operation handle is connected is to be pulled and the latching operation of a latch to which the other end of the operation handle is connected is to be released. Here, the latch is provided for fixing a closing state of the fuel door through the cable 100, and when the cable 100 is pulled by an operation of a driver, the fixing state of the fuel door is released to allow the fuel door to be opened.

Meanwhile, the cable 100 may be formed with a plurality of wires to be twisted in a direction and the outer screws 220 of the fixing body 200 are formed in the oblique lines directed to the same direction as the twisted direction of the cable 100.

Here, the cable 100 may be a wire rope that is formed with a plurality of wires twisted as a several strands.

The cable 100 may be formed with a plurality of strands that are twisted in a direction, as shown in FIG. 2, and the cable may be formed with a plurality of iron wires to be twisted, with an excellent durability.

When the cable 100 is pulled by an operation of the first operation part 10, the fixing body 200 fixed to the cable 100 is moved together with the cable 100, and the fixing body 200 is rotated due to a relative movement of the outer screws 220 of the fixing body 200 and the inner screws 320 of the guide bracket 300.

Here, in cases where the cable 100 formed with a plurality of strands to be twisted is applied and the twisting direction of the cable 100 is opposite to a rotation direction of the fixing body 200, a plurality of strands of the cable 100 come untied as the cable 100 is pulled and the fixing body 200 is rotated.

However, in a case where the twisting direction of the cable 100 is identical to a rotation direction of the fixing body 200, a plurality of strands of the cable 100 become twisted more firmly, and thereby can reduce a length of the cable 100.

Meanwhile, the fixing body 200 may be fixed to the cable 100 not to be rotated relatively to the cable 100 and may be moved together with the cable 100 when the cable 100 is pulled.

The fixing body 200 according to the present invention has to guide the cable 100 to be twisted when it is rotated and the fixing body has to be fixed not to be moved relatively to the cable. As described above, the fixing body 200 is fixed integrally to the cable 100, and thus is moved together with the cable 100 when the cable 100 is pulled, whereas the fixing body is rotated relatively to the guide bracket 300 through the respective screws. As a result, the cable 100 provided with the fixing body 200 is rotated and twisted while the cable is moved integrally with the fixing body 200.

Meanwhile, the outer screws 220 of the fixing body 200 may be formed to be longer than a maximal moving displacement of the cable 100.

Further, the inner screws 320 of the guide bracket 300 may be formed to be longer than a maximal moving displacement of the cable 100.

As described above, the outer screws 220 of the fixing body 200 or the inner screws 320 of the guide bracket 300 are formed to be longer than the maximal moving displacement of the cable 100, and thus even when the moving distance of the cable 100 becomes greater when a user operates the first operation part 10 at a maximum level, the fixing body 200 is not to be separated from the guide bracket 300. Here, even though any one of the outer screws 220 of the fixing body 200 and the inner screws 320 of the guide bracket 300 is formed to be longer than the maximal moving displacement of the cable 100, all of the respective screws may be formed to be longer than the maximal moving displacement of the cable 100 to prevent perfectly the fixing body 200 from being separated from the guide bracket 300 and to be rotated smoothly.

Meanwhile, a width of the guide bracket 300 in a longitudinal direction may be narrower than a width of the fixing body 200 in a longitudinal direction.

The fixing body 200 and the guide bracket 300 according to the present invention are kept in a meshing state through the respective screws and the fixing body 200 is rotated and moved on an inner peripheral surface of the guide bracket 300 when the cable 100 is pulled. As a result, since the outer peripheral surface of the fixing body 200 is rubbed essentially against the inner peripheral surface of the guide bracket 300, the width of the guide bracket 300 in a longitudinal direction may be formed to be narrower than the width of the fixing body 200 in a longitudinal direction to reduce the friction between them. Here, the width of the fixing body 200 in a longitudinal direction may be formed to be longer than the maximal moving displacement of the cable 100 not to be separated from the guide bracket 300.

The threads that are formed on the outer screws 220 formed on an outer peripheral surface of the fixing body 200 and the inner screws 320 formed on an inner peripheral surface of the guide bracket 300 have to be set intervals between them, considering a rigidity of the cable 100. That is, when the threads that are formed on the respective screws of the fixing body 200 and the guide bracket 300 are formed to be dense, the cable 100 is twisted excessively when the fixing body 200 is rotated at the guide bracket 300 to rupture the cable 100, or the first operation part 10 cannot to be operated. Accordingly, the intervals of the threads constituting the respective screws may be set in accordance with the rigidity of the cable 100.

Figure 6:
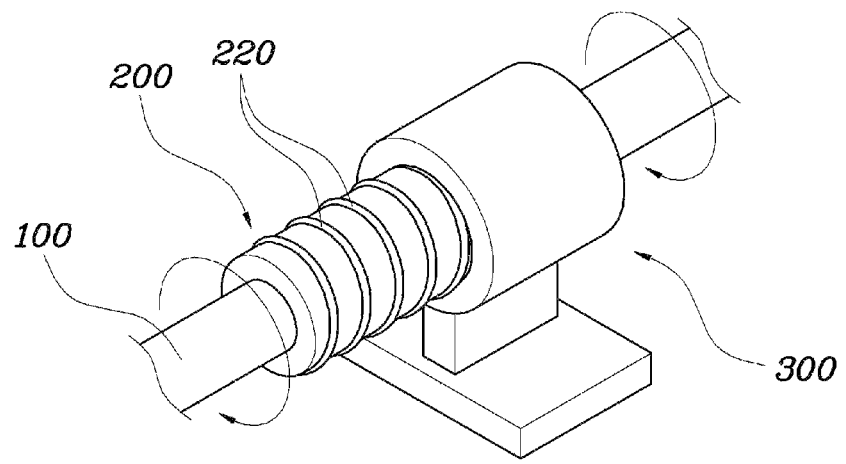
FIG. 6 is a perspective view showing a fixing body that is rotated according to pulling the cable of the cable slack prevention device as shown in FIG. 2.

As described above, an operation state is shown in FIGS. 5 to 7, in which the fixing body 200 and the guide bracket 300 are rotated relatively to be rotated and moved when the cable 100 is pulled by the first operation part 10.

Meanwhile, a fuel door apparatus provided with the cable slack prevention mechanism according to various embodiments of the present invention includes: a door handle 10 that is operated by a user to open/close selectively a fuel door hinged and fixed to a vehicle body; a latch 40 for releasing the latching operation of the fuel door to open the fuel door; a cable 100 one end of which is connected to the door handle and the other end of which is connected to the latch, and which is pulled with the operation of the door handle to release the latching operation of the latch; a fixing body 200 which is fixed to the cable 100 with surrounding it and is formed as a cylinder shape, and on an outer peripheral surface of which outer screws 220 are formed; and a guide bracket 300 which is fixed to a vehicle body and surrounds the fixing body 200, and on an inner peripheral surface of which inner screws 320 are formed, which are meshed with the outer screws 220 of the fixing body 200, allowing the cable 100 to be rotated along the screws and twisted when the cable 100 is pulled.

According to the slack prevention mechanism for the cable 100 and a fuel door apparatus provided the same, the cable 100 that is pulled by the door handle is rotated to be twisted through the respective screws formed on the fixing body 200 and the guide bracket 300 thereby to increase rigidity and reduce a length of the cable 100.

As a result, even when the cable 100 is deteriorated and a length thereof is loosened somewhat, the operating force as intended when it is designed initially can be transferred smoothly when the cable 100 is pulled.

For convenience in explanation and accurate definition in the appended claims, the terms rear, etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cable slack prevention device comprising:
    a cable including opposing ends respectively connected to a first operation part and a second operation part, wherein the cable is pulled by an operation of the first operation part to link with the second operation part;

a fixing body fixed to the cable and including a cylindrical shape surrounding the cable and an outer peripheral surface having an outer screw thread; and a guide bracket fixed to a vehicle body and surrounding the fixing body, the guide bracket including an inner peripheral surface having an inner screw thread engaging with the outer screw thread of the fixing body and allowing the cable to rotate and twist as the cable is pulled, wherein the first operation part is an operation handle that is handled by a user and the second operation part is a latch.

2. The cable slack prevention device of claim 1, wherein the cable is formed with a plurality of wires twisted in a direction and the outer screw thread of the fixing body are formed in oblique lines directed in the same direction as the twisted direction of the cable.

3. The cable slack prevention device of claim 1, wherein the cable is a wire rope that is formed with a plurality of wires twisted as a several strands.

4. The cable slack prevention device of claim 1, wherein the fixing body is fixed not to rotated relatively to the cable and is moved together with the cable when the cable is pulled.

5. The cable slack prevention device of claim 1, wherein the outer screw thread of the fixing body is longer than a maximal moving displacement of the cable.

6. The cable slack prevention device of claim 1, wherein the inner screw thread of the guide bracket is longer than a maximal moving displacement of the cable.

7. The cable slack prevention device of claim 1, wherein a width of the guide bracket in a longitudinal direction is formed to be narrower than a width of the fixing body in a longitudinal direction.

8. A fuel door apparatus provided with a cable slack prevention device comprising:

a door handle operated by a user to selectively open and close a fuel door hingedly affixed to a vehicle body;

a latch for releasing the fuel door to open the fuel door;

a cable including opposing ends, a first end connected to the door handle and a second end connected to the latch, wherein the cable is pulled with an operation of the door handle to release a latching operation of the latch;

a fixing body fixed to the cable and including a cylindrical shape surrounding the cable and an outer peripheral surface having an outer screw thread; and a guide bracket fixed to the vehicle body and surrounding the fixing body, the guide bracket including an inner peripheral surface having an inner screw thread engaging with the outer screw thread of the fixing body allowing the cable to rotate and twist when the cable is pulled.

* * * * *